(12) United States Patent
Bowles et al.

(10) Patent No.: US 7,083,118 B1
(45) Date of Patent: Aug. 1, 2006

(54) DEVICE FOR INJECTING AND MIXING LIQUID FERTILIZER WITH WATER FLOW IN A SPRINKLER SYSTEM PIPELINE

(76) Inventors: C. Anthony Bowles, 614 Etta St., Los Angeles, CA (US) 90065; Dwight N. Johnson, 6327 Chorlito St., Carlsbad, CA (US) 92009; Igancio Cano, 8940 E. Duarte Rd., San Gabriel, CA (US) 91775

( * ) Notice: Subject to any disclaimer, the term of this patent is extended or adjusted under 35 U.S.C. 154(b) by 26 days.

(21) Appl. No.: 11/206,449

(22) Filed: Aug. 17, 2005

(51) Int. Cl.
*A62C 5/02* (2006.01)

(52) U.S. Cl. ...................... 239/310; 239/317; 239/569; 239/570; 137/98; 137/111

(58) Field of Classification Search ................ 239/310, 239/317, 569, 570, 576, 583; 137/111, 98, 137/268; 222/137
See application file for complete search history.

(56) References Cited

U.S. PATENT DOCUMENTS 4,064,891 A * 12/1977 Eberhardt .................... 137/98
5,314,120 A * 5/1994 Nau et al. .................... 239/310

* cited by examiner

*Primary Examiner*—Dinh Q. Nguyen

(57) ABSTRACT

The invention relates to a device for mixing a liquid such as fertilizer with water flow in a sprinkler pipeline where the liquid is timely dispensed over a period of time from a fertilizer chamber into a mixing chamber for mixing with the water before re-entering the pipeline. The device has a flexible diaphragm that sealingly separates a mixing chamber from a fertilizer chamber. A central disk is fixedly carried by the diaphragm and is biased by a first spring that applies a restoring force upon displacement of the central disk. A valve seat on an axial extension of the central disk extending into the mixing chamber is so dimensioned and proportioned to seat a pin holder fixed to an adjuster holder upon engagement by the pin holder. The adjuster holder is responsive to a second spring and the water pressure in the mixing chamber. A restrictor pin carried by the pin holder is displaced upon compression of the second spring to permit communication between fluid in the fertilizer chamber and mixing chamber when sufficient water pressure compresses the second spring. When the water flow is sufficiently reduced, the accompanying reduction in the water pressure will permit the second spring to expand and seat the pin holder in the valve seat thereby preventing further flow of the liquid from the fertilizer chamber into the mixing chamber.

36 Claims, 6 Drawing Sheets

DEVICE FOR INJECTING AND MIXING LIQUID FERTILIZER WITH WATER FLOW IN A SPRINKLER SYSTEM PIPELINE

FIELD OF THE INVENTION

The present invention relates to a device for injecting and mixing liquid fertilizer or other liquid additive with water flow in a sprinkler system pipeline.

BACKGROUND OF THE INVENTION

The introduction of liquid fertilizer or other liquid additive into a sprinkler system pipeline from a reservoir has been known in the prior art. The present invention, however, utilizes a liquid fertilizer cartridge that dispenses a predetermined volume of fertilizer into a mixing chamber with each water application where the fertilizer is mixed in the mixing chamber with water and the mixture then enters the water flow in the sprinkler system pipeline. In the prior art, a multiplicity of membranes have been used where each was responsive to water pressure differences across the membrane to open and close flow paths permitting fertilizer to flow directly into the sprinkler system pipeline where it mixed with the water flow to the sprinkler. The present invention has a single diaphragm that is responsive to spring forces and water pressure in the pipeline and the fertilizer is mixed in the mixing chamber before entering the pipeline which permits a more uniform distribution of the fertilizer into the waterflow.

In U.S. Pat. No. 3,367,353 a device is described for injecting liquid fertilizer into a sprinkler system. The device of the U.S. Pat. No. 3,367,353 utilizes two flexible diaphragms and a spool valve to achieve the desired injection function at the start of the cycle. The U.S. Pat. No. 3,367,353 is responsive to substantial pressure differences across the diaphragms to operate and requires a differential pressure to inject the fertilizer into the water stream. The discharge line of the U.S. Pat. No. 3,367,353 through which the fertilizer enters the water stream remains filled with fertilizer after an irrigation cycle and the fertilizer has continuous access to the downstream leg of the system when the irrigation cycle is completed.

It is desirable to provide a device that dispenses fertilizer over a period of time to evenly distribute the fertilizer rather than to dispense the fertilizer as an immediate slug. It is further desirable to provide a device that does not require differential pressures to inject the fertilizer and which reduces the pressure loss and impedance of water flow resulting from the creation of the differential pressures within the pipeline. Another desirable feature in the present invention is that substantially all of the fertilizer charged in the fertilizer chamber is mixed in the mixing chamber when the injection cycle of the fertilizer into the system is completed.

SUMMARY OF THE INVENTION

There is, therefore, provided according to the present invention, a device for mixing liquid fertilizer or an additive such as an insecticide with water flow in a sprinkler system pipeline where the liquid fertilizer is timely dispensed over a period of time from a fertilizer chamber into a mixing chamber where the fertilizer mixes with water and then enters into the pipeline.

The present invention is directed to a device for mixing an additive such as liquid fertilizer or insecticide to water flow in a sprinkler system pipeline that consists of a housing having a central axis where the housing has a fertilizer chamber and a mixing chamber. A supply cartridge containing the liquid additive is in fluid communication with the fertilizer chamber. The housing has an inlet port and an outlet port that communicates with the pipeline; both the inlet and outlet ports are also in fluid communication with the mixing chamber. A flexible diaphragm having an upper surface and a lower surface extends laterally of the central axis within the housing and has a peripheral edge which is so fixed to the housing so as to form a seal between the fertilizer chamber and the mixing chamber. The fertilizer chamber is bounded in part by the upper surface of the flexible diaphragm and mixing chamber is bounded in part by the lower surface.

The flexible diaphragm integrally carries a central portion that is displaceable upon sufficient axial deflection of the diaphragm. A first bias means carried by the housing is responsive to axial displacement of the central portion and applies a restoring force to the central portion in a direction opposite to its displacement. A valve means associated with the central portion is responsive to fluid pressure in the mixing chamber and permits the flow of liquid fertilizer or insecticide into the mixing chamber; the valve means in response to fluid pressure in the mixing chamber may also shut the flow of liquid fertilizer or insecticide into the mixing chamber.

A second bias means associated with the valve means and the central portion is responsive to fluid pressure in the mixing chamber and actuates the valve means to permit and shut the flow of liquid fertilizer or insecticide from the fertilizer chamber into the mixing chamber. The housing contains a check valve means that communicates with the fertilizer chamber and is responsive to fluid pressure in the fertilizer chamber to prevent retrograde flow of the liquid fertilizer or insecticide from the fertilizer chamber into the supply cartridge. In the preferred embodiment of the invention, the first bias means is a spring that bears against the housing and the central portion thereby biasing the central portion oppositely to its displacement. A diaphragm retainer extends axially and is carried by the central portion where the diaphragm retainer has an axially extending void therein to permit slidable movement of a restrictor pin that is fixed and extends axially from a pin holder associated with the valve means and second bias means. The pin holder is so dimensioned and proportioned and adapted to couple with the valve seat in the diaphragm retainer to preclude flow of fertilizer or insecticide from the fertilizer chamber to the mixing chamber when the pin holder is seated in the valve seat. The second bias means in the preferred embodiment comprises an adjuster member having an outer surface and an inner surface. The outer surface is in part bounded by the mixing chamber such that liquid pressure in the mixing chamber will apply a force to the outer surface. The lower or opposite surface is biased by an adjuster spring that is fixed to the housing such that sufficient pressure acting on the outer surface will compress the spring axially. The pin holder is fixed to the outer surface of the adjuster member and upon compression of the adjuster spring unseats from the valve seat thereby permitting liquid fertilizer to flow from the fertilizer chamber into the mixing chamber.

BRIEF DESCRIPTION OF THE DRAWINGS

These and other features and advantages will become appreciated as the same become better understood with reference to the following specification, claims and drawings wherein:

DETAILED DESCRIPTION

Figure 1:
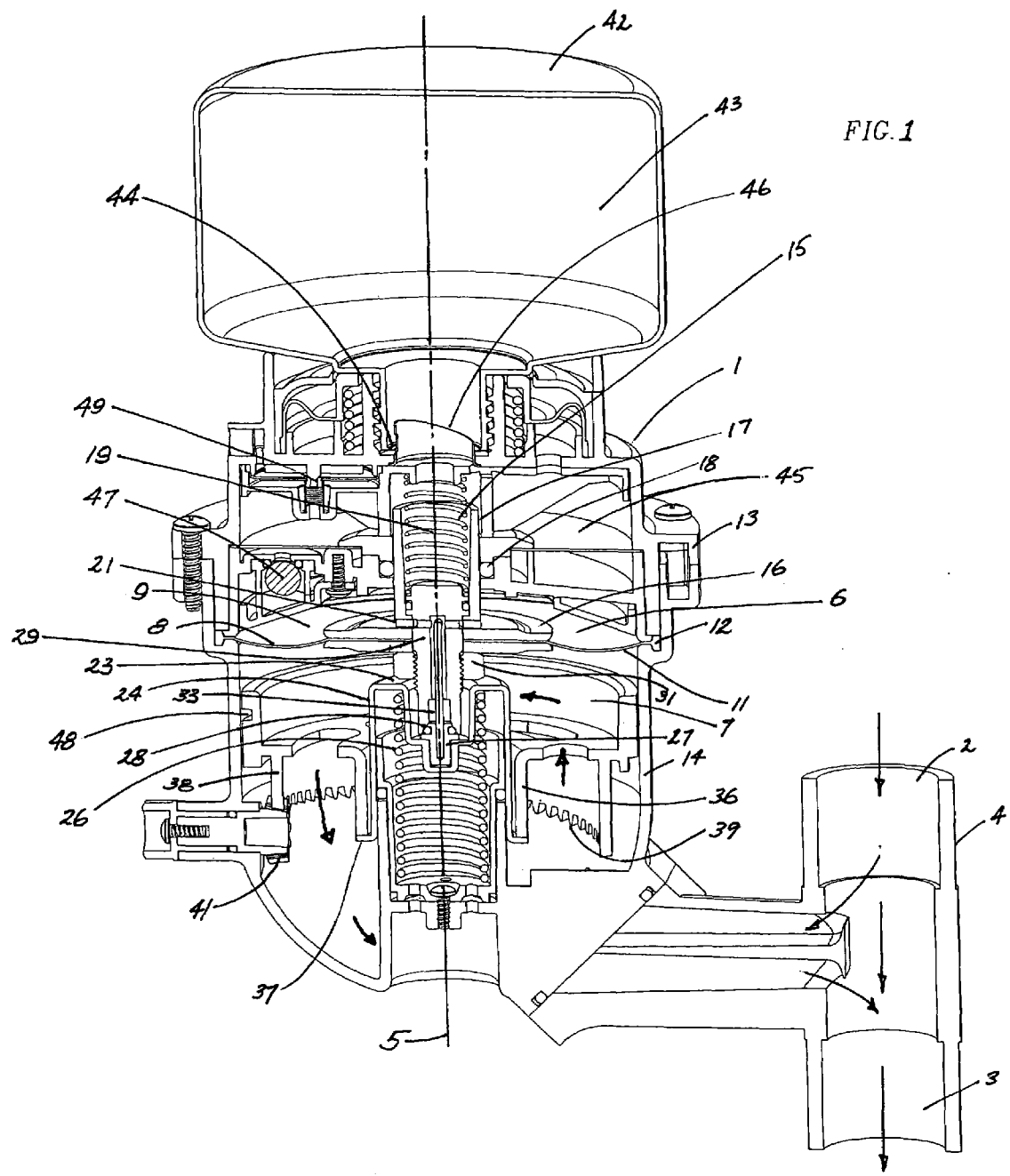
FIG. 1 is a sectioned perspective view illustrating the beginning of an irrigation cycle.

Referring to FIG. 1, which is a sectioned perspective view illustrating the preferred embodiment of this invention, the fertilizer injection and mixing device 1 having a central axis 5 can be seen at the beginning of the irrigation cycle, i.e., at the time water flow in the sprinkler system pipeline begins to enter the mixing chamber of the device. The sprinkler system pipeline is not shown in FIG. 1; however, water flow within the pipeline is shown entering T-shaped member 4 at inlet 2 and exiting through outlet 3 of T-shaped member 4 into the pipeline.

Figure 2:
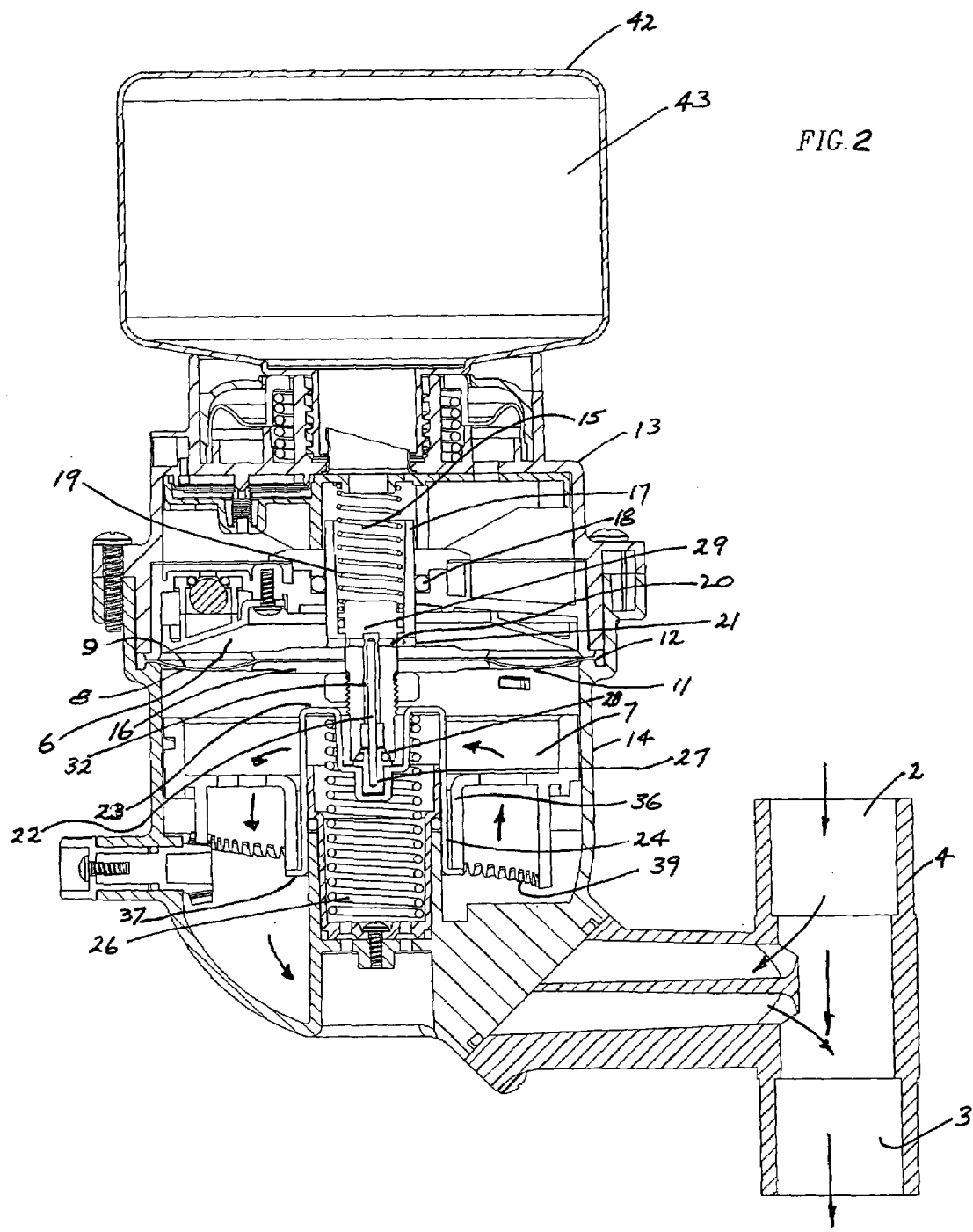
FIG. 2 is a cross-sectional view of the device of this invention at the beginning of an irrigation cycle.

FIG. 2 is a cross-sectional view of FIG. 1 and also depicts the beginning of the irrigation cycle at the same moment as shown in FIG. 1. FIGS. 2 through 5 sequentially illustrate the irrigation cycle of the fertilizer injection and mixing device 1 as fertilizer is metered from the fertilizer chamber 6 into the mixing chamber 7 and the mixture thereafter dispensed into the pipeline through outlet 3 of T-shaped member 4.

Figure 6:
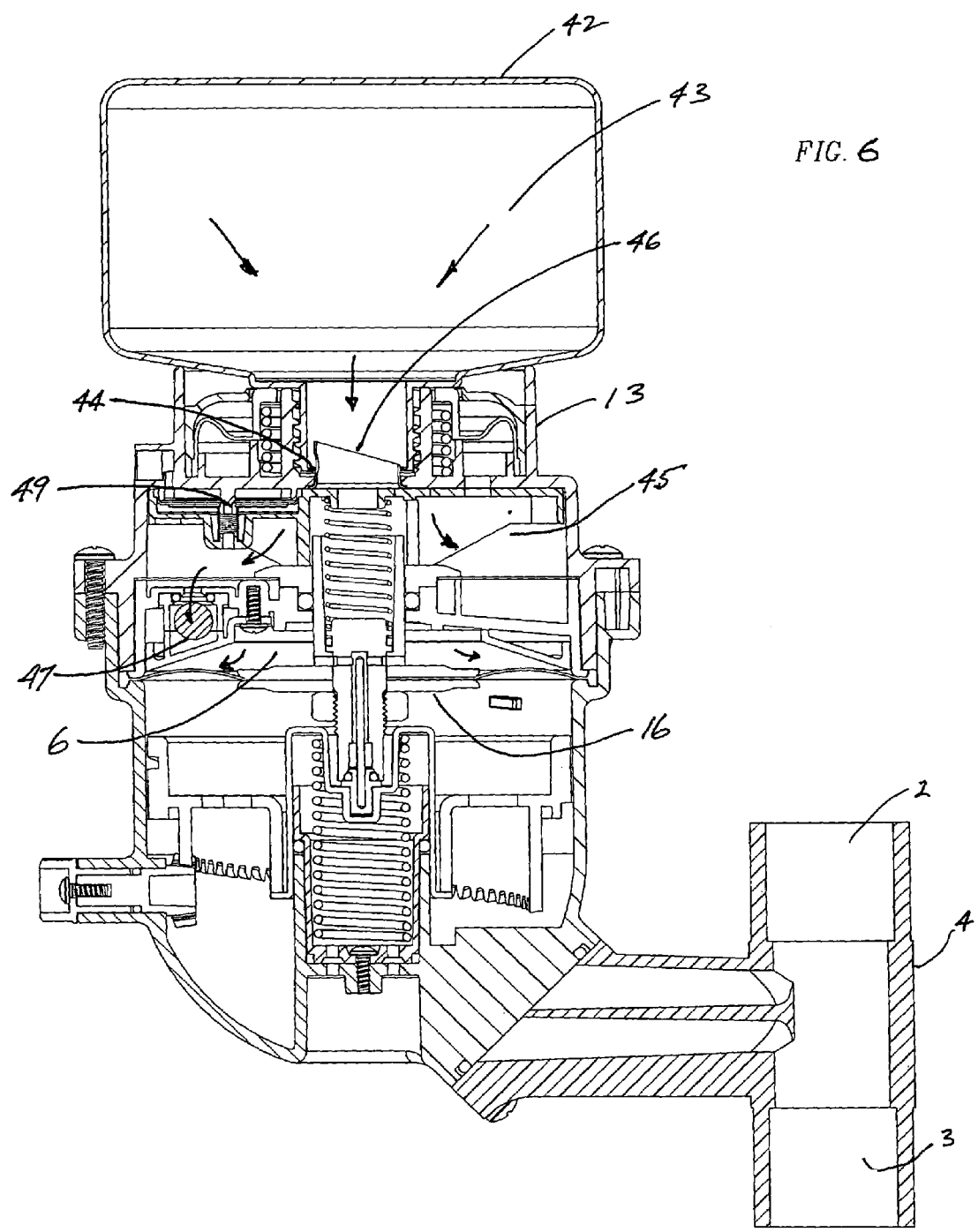
FIG. 6 is a cross-sectional view of the device illustrating the recharging of the fertilizer chamber.

After substantially all of the liquid fertilizer in the fertilizer has flowed into the mixing chamber 7 and the mixture carried into the system, the irrigation cycle is completed although water may continue to flow in the sprinkler system; after water shut-off, however, and water no longer flowing into the sprinkler system, the fertilizer chamber 6 will re-charge with fertilizer from cartridge 42; re-charging of the fertilizer chamber 6 is illustrated in FIG. 6 and will be more definitively described hereafter.

Referring again to FIG. 1, diaphragm 8 has an upper surface 9 and a lower surface 11 where upper surface 9 forms in part a boundary of fertilizer chamber 6. Lower surface 11 forms in part a boundary of mixing chamber 7. A circumferential seal between the fertilizer and mixing chamber is provided by diaphragm 8 which has a peripheral boundary 12 that is compressed between upper housing 13 and lower housing 14 to form the seal.

As can be seen in FIGS. 1 and 2, diaphragm 8 carries a central disk 16 that has a piston 17 which is carried in fixed relationship with central disk 16. Piston 17 extends through fertilizer chamber 6 and is sealed with respect to upper housing 13 by O-ring 18. As can be further seen in FIG. 1, piston 17 has an opening 15 at its upper end opposite its carried end fixed to central disk 16. First bias spring 19 extends through opening 15 and is biased between upper housing 13 and central disk 16 such that vertical displacement of central disk 16 will cause first bias spring 19 to exert a force on disk 16 that will also be transmitted to diaphragm 8. Piston 17 has a base portion 20 that contains vents communicating with fertilizer chamber 6; by referring to FIG. 3, it can be seen that a vent 21 is opened to permit fluid communication between fertilizer chamber 6 and the mixing chamber 7 when restrictor pin 22 is displaced vertically as water pressure builds within the mixing chamber. The water pressure in the mixing chamber 7 acts upon upper surface 23 of adjuster holder 24 to compress second bias spring 26. By referring to FIG. 1, the surface area of upper surface 23 of adjuster holder 24 is shown in perspective to illustrate the compression surface upon which the water pressure acts to compress second bias spring 26.

Figure 3:
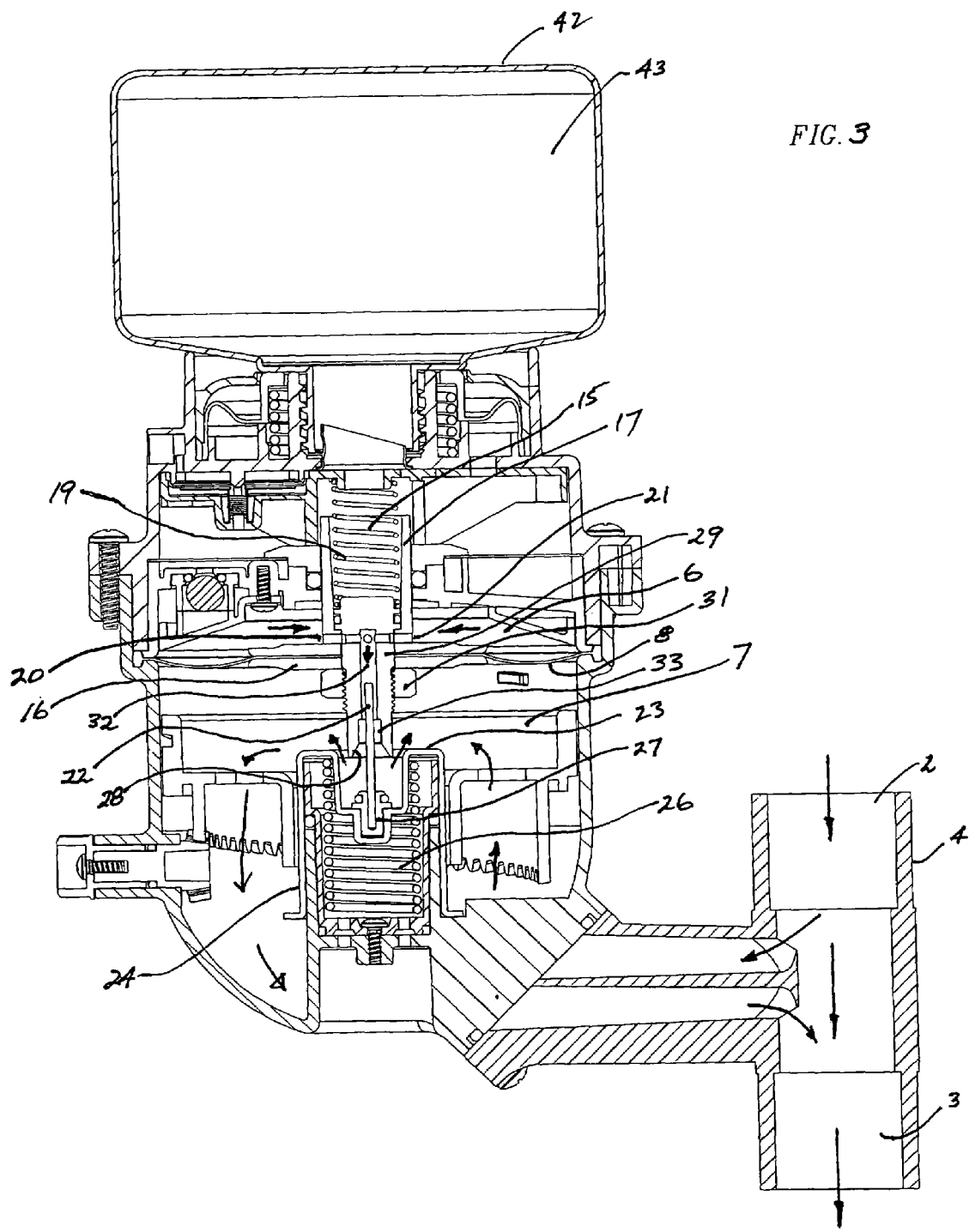
FIG. 3 is a cross-sectional view illustrating the beginning of the injection of liquid fertilizer or other liquid additive from the fertilizer chamber into the mixing chamber.

Referring again to FIGS. 2 and 3, it can be seen that restrictor pin 22 is fixed to the adjuster holder 24 by pin holder 27 such that compression of second bias spring 26 unseats pin holder 27 from valve seat 28. Diaphragm retainer 29 extends axially through central disk 16 and is fastened to central disk 16 by diaphragm nut 31. As can be seen in FIG. 3, diaphragm retainer 29 has an axially extending void 32 that flares into tapered valve seat 28. As can be further seen in FIGS. 2 and 3, restrictor pin 22 extends into void 32 through retainer bushing 32. When second bias spring 26 is compressed as shown in FIG. 3, vent 21 is opened and communicates with void 32 thereby permitting liquid fertilizer to flow from fertilizer chamber 6, into and through void 32, and past the restrictor pin 22 and retainer bushing 33 into the mixing chamber 7.

Figure 4:
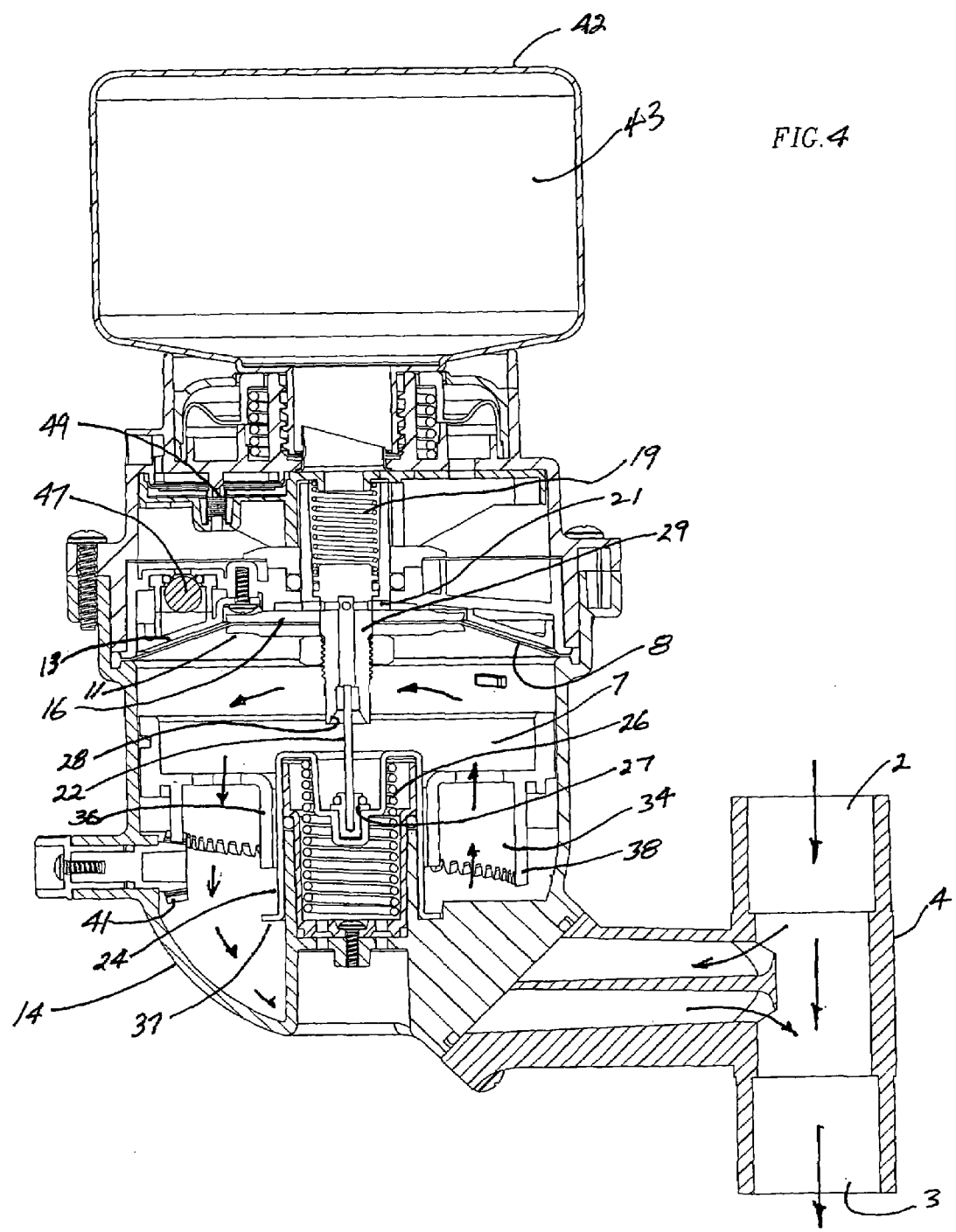
FIG. 4 is a cross-sectional view of the device upon completion of the injection cycle.
Figure 5:
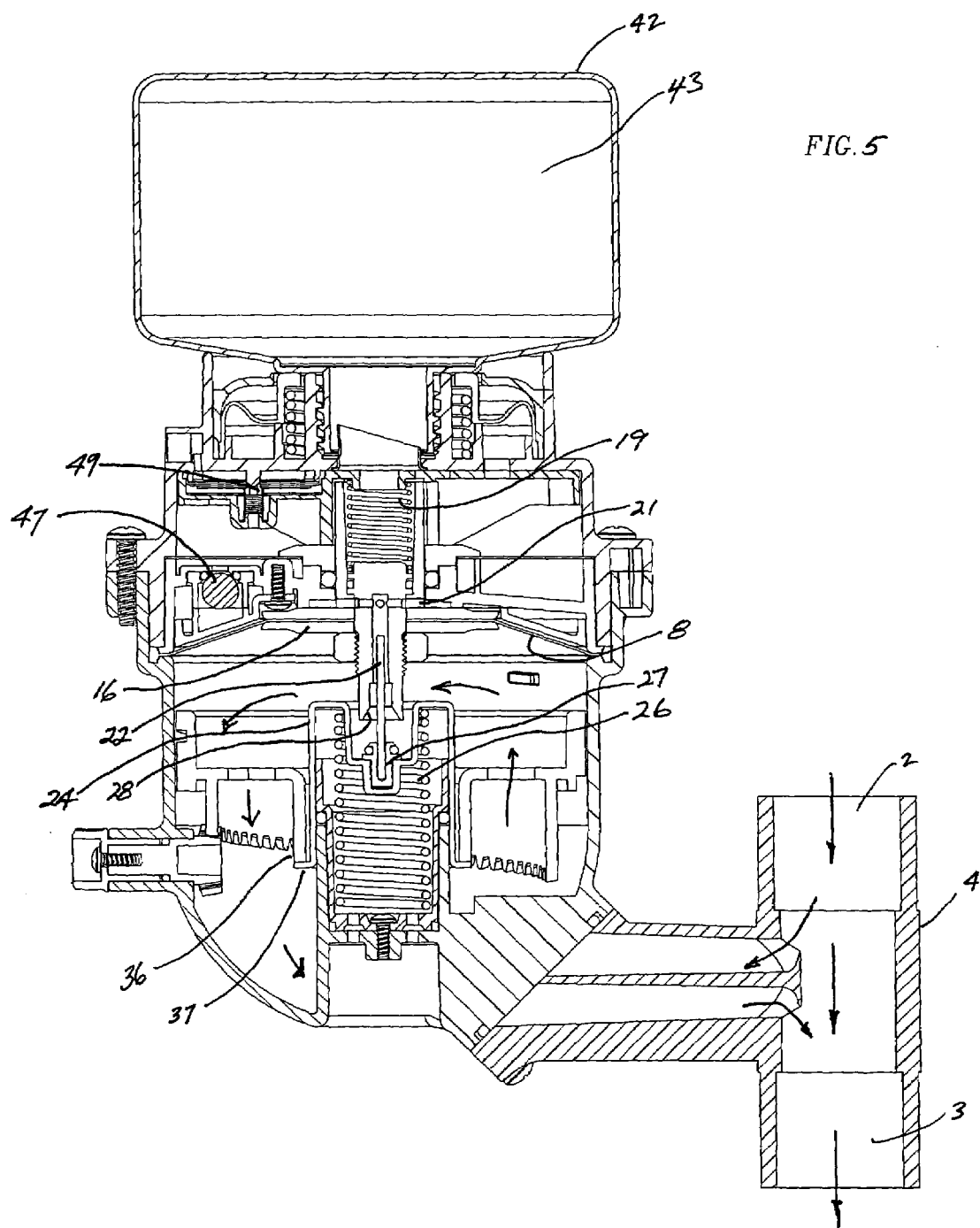
FIG. 5 is a cross-sectional view of the device upon completion of the irrigation cycle.

In FIG. 4, the diaphragm 8 and central disk 16 have reached the limit of axial displacement resulting from water pressure in the mixing chamber exerting a force on the lower surface 11 of the diaphragm and the central disk. Substantially all of the liquid fertilizer in fertilizer chamber will have been displaced through vent 21 and into the mixing chamber which completes the irrigation cycle. By reducing water flow in the sprinkler system pipeline, the water pressure will be reduced in the mixing chamber and second bias spring 26 will expand as shown in FIG. 5 thereby causing vertical displacement of restrictor pin 22 in the direction of vent 21. As the restrictor pin 22 is displaced vertically, first bias spring 19 will expand causing a force to be applied to central disk 16 which will seat pin holder 27 into valve seat 28. The vertical displacement of restrictor pin 22 is adjustable so that the amount of liquid fertilizer that feeds into the fertilizer chamber may be pre-determined. The adjustment mechanism that is preferred to provide the pre-determined amount of liquid fertilizer may be understood by reference to FIGS. 4 and 5.

An adjuster gear member 34 for controlling the charge of fertilizer is shown in FIG. 4. Adjuster gear member 34 has an inner collar 36 that telescopically receives adjuster holder 24. Adjuster holder 24 has a peripheral flange 37 that upon engagement with inner collar 36 precludes further axial displacement of adjuster holder 24 in the direction of vent 21. As can be seen in FIG. 4, adjustable gear member 34 has an outer skirt 38 that contains gear teeth 39. An adjuster pinion 41 engages gear teeth 39 and is rotatable which permits adjuster gear member 34 to be rotated with respect to lower housing 14. By rotation of adjuster gear member 34, the inner collar 36 may be set to a pre-selected vertical separation from peripheral flange 37 thereby pre-determining the volume of liquid fertilizer that can be dispensed from fertilizer chamber 6. By referring to FIG. 4, it can be seen that the periphery of outer skirt 38 is truncated and varies circumferentially; this permits the adjuster gear member 34 to be raised or lowered by rotating adjuster pinion 41 and consequently pre-set the vertical distance between adjuster gear inner collar 36 and peripheral flange 37. Although not shown in the drawings, lower housing 14 has a flange that slidably engages slot 48 which permits rotation of adjuster gear 34 with respect to lower housing 14. It can be seen in FIG. 5 that peripheral flange 37 has engaged adjustable gear inner collar 36 thus precluding any further vertical displacement of adjuster holder 24; however, at the time of engagement, pin holder 27 will not yet have been seated in valve seat 28. First bias spring 19 will, after the engagement occurs, overcome the water pressure in the mixing chamber exerted against diaphragm 8 and the expansion of bias spring 19 and will seat pin holder 27 into valve seat 28. FIG. 6 illustrates the seating of pin holder 27 into valve seat 28 after which fertilizer liquid will recharge fertilizer chamber 6.

The charging of liquid fertilizer or insecticide additive is shown in FIG. 6. Cartridge 42 contains liquid fertilizer 43 in the preferred embodiment; however, the liquid could be an insecticide, or an additive liquid. Cartridge 42 has a foil seal 44 covering the mouth or opening of the cartridge. As the cartridge is threaded into upper housing 13, cutter 46 pierces the foil which permits the liquid in the cartridge to flow into first chamber 45 past check valve 47 when it is unseated and into fertilizer chamber 6. The flow of the liquid fertilizer into the fertilizer chamber is illustrated by arrows in FIG. 6. It can be appreciated that when the central disk is displaced vertically by water pressure acting against diaphragm 8, check valve 47 will close and liquid from the cartridge will no longer flow from first chamber 45 into the fertilizer chamber 6.

The beginning of the irrigation cycle is shown in FIG. 1 which is a sectioned perspective view of the device of this invention. When the water supply enters T-shaped member 4 through inlet 2, as illustrated by the arrows in FIG. 1, the water will enter into the mixing chamber 7 and water pressure will then begin to increase within the chamber. As can be seen in FIG. 1, the water pressure will act on upper surface 23 of adjuster holder 24. With an increase of pressure, second bias spring 26 will begin to compress to oppose the force acting on upper surface 23. As the pressure further increases pin holder 27 will be displaced vertically and will unseat from valve seat 28. At the same time, water pressure in the mixing chamber also acts against diaphragm 8 and central disk 16 to compress the fertilizer liquid 43 in fertilizer chamber 6 while piston 17 compresses first bias spring 19. The increased pressure in the fertilizer chamber seats check valve 49 thereby preventing liquid fertilizer from flowing into the fertilizer chamber.

Referring to FIG. 3, it can be seen that restrictor pin 22 has been sufficiently displaced vertically to open vent 21 which is in fluid communication with the fertilizer chamber 6 thereby permitting liquid fertilizer to flow through retainer void 32 and into the mixing chamber 7. As can be more easily seen in FIG. 4, diaphragm 8 and central disk 16 have been displaced sufficiently to collapse fertilizer chamber 6 against upper housing 13 and consequently inject the volume of liquid fertilizer contained in the fertilizer chamber into the mixing chamber while check valve 47 remains seated. As the water pressure in the mixing chamber decreases with water shut-off (illustrated in FIG. 5), second bias spring 26 will exert a force against adjuster holder 24 which will displace the adjuster holder until flange 37 engages the adjuster gear inner collar 36. First bias spring 19, which has a spring constant that is less than the spring 26, thereafter expands and applies a force to diaphragm retainer 29 which is displaced vertically until pin holder 27 is seated into valve seat 28. With the irrigation cycle completed, check valve 47 opens and the fertilizer chamber is re-charged with liquid fertilizer as illustrated by the arrows in FIG. 6. A relief valve 49 opens during this sequence and limits the vacuum on the side walls of cartridge 42 to promote the free flow of fertilizer from the cartridge.

While the embodiment of a device for injecting and mixing fertilizer and returning the mixture to a sprinkler system pipeline has been shown and described, it is to be understood that the invention is subject to many modifications.

What is claimed:

1. A device for mixing liquid additive to water flow in a sprinkler system pipeline, comprising:
    a) a housing having a central axis, an inlet port communicating with said pipeline and an outlet port communicating with said pipeline, said housing further having a fertilizer chamber and a mixing chamber where said inlet and outlet ports are in fluid communication with said mixing chamber;
    b) a flexible diaphragm having an upper surface and a lower surface extending laterally within said housing, said flexible diaphragm further having a peripheral edge, where said peripheral edge is fixed with respect to said housing and so mounted thereto to form a seal between said fertilizer chamber and said mixing chamber, and where said fertilizer chamber is bounded in part by said upper surface and said mixing chamber is bounded in part by said lower surface;
    c) a central portion integrally carried by said flexible diaphragm and axially displaceable upon sufficient deflection of said diaphragm;
    d) first bias means carried by said housing responsive to axial displacement of said central portion for applying a restoring force to said central portion upon said axial displacement;
    e) valve means responsive to fluid pressure in said mixing chamber associated with said central portion for permitting and interrupting liquid additive flow from said fertilizer chamber into said mixing chamber;
    f) second bias means associated with said valve means and said central portion responsive to fluid pressure in said mixing chamber for actuating said valve means to permit liquid fertilizer flow from said fertilizer chamber into said mixing chamber and to interrupt the flow; and
    g) check valve means carried by said housing and communicating with said fertilizer chamber responsive to fluid pressure in said fertilizer chamber for precluding retrograde flow of said liquid additive from said fertilizer chamber.

2. The device recited claim 1 where said central portion comprises a central disk carried in fixed relationship with said flexible diaphragm and having a lateral dimension less than the lateral dimension of said of said flexible diaphragm.

3. The device recited in claim 2 where said central portion further comprises an axially extending piston fixed to said central disk, said piston having a base portion where said base portion has a vent opening communicating with said fertilizer chamber.

4. The device recited in claim 3 where said central portion further comprises a diaphragm retainer extending axially from said central portion in part within said mixing chamber where said diaphragm retainer has an axially extending retainer void therein communicating with said vent opening.

5. The device recited claim 4 where said first bias means comprises a first bias spring associated with said piston and so mounted such that said first bias spring is in bearing relationship with said housing and said base portion.

6. The device recited in claim 5 further comprising a liquid supply reservoir carried by said housing where said housing further comprises a first chamber in fluid communication with said liquid reservoir and said check valve means.

7. The device recited in claim 1 where said valve means comprises an axially extending restrictor pin, a pin holder integrally carrying said restrictor pin, an adjuster holder carrying said pin holder where said pin holder is fixed to said adjuster holder, and a valve seat associated with said central portion for receiving said pin holder where said valve seat and said pin holder are so dimensioned and proportioned such that upon bearing engagement the flow of said liquid additive into said mixing chamber is interrupted and upon sufficient disengagement said liquid additive is permitted to flow into said mixing chamber.

8. The device recited in claim 7 where said central portion comprises a central disk carried in fixed relationship with said flexible diaphragm and having a lateral dimension less than the lateral dimension of said of said flexible diaphragm.

9. The device recited in claim 8 where said central portion further comprises an axially extending piston fixed to said central disk, said piston having a base portion where said base portion has a vent opening communicating with said fertilizer chamber.

10. The device recited in claim 9 where said central portion further comprises a diaphragm retainer extending axially from said central portion in part within said mixing chamber where said diaphragm retainer has an axially extending retainer void therein communicating with said vent opening.

11. The device recited in claim 10 where said first bias means comprises a first bias spring associated with said piston and so mounted such that said first bias spring is in bearing relationship with said housing and said base portion.

12. The device recited in claim 11 further comprising a liquid supply reservoir carried by said housing where said housing further comprises a first chamber in fluid communication with said liquid reservoir and said check valve means.

13. The device recited in claim 1 where said second bias mean comprises a second bias spring carried by said housing, an adjuster holder having an upper surface extending at least in part laterally within said mixing chamber and a lower surface in bearing relationship with said second bias spring, a pin holder attached to said upper surface, and an axially extending restrictor pin fixed to said pin holder.

14. The device recited in claim 13 where said valve means comprises said axially extending restrictor pin, said pin holder, said adjuster holder, and a valve seat associated with said central portion for receiving said pin holder where said valve seat and said pin holder are so dimensioned and proportioned such that upon sufficient bearing engagement said liquid additive flow into said mixing chamber is interrupted and upon sufficient disengagement said liquid additive is permitted to flow into said mixing chamber.

15. The device recited in claim 13 where said central portion comprises a central disk carried in fixed relationship with said flexible diaphragm and having a lateral dimension less than the lateral dimension of said flexible diaphragm.

16. The device recited in claim 15 where said central portion further comprises an axially extending piston fixed to said central disk, said piston having a base portion where said base portion has a vent opening communicating with said fertilizer chamber.

17. The device recited in claim 16 where said central portion further comprises a diaphragm retainer extending axially from said portion in part within said mixing chamber where said diaphragm retainer has an axially extending retainer void therein communicating with said vent opening.

18. The device recited in claim 15 where said first bias means comprises a first bias spring associated with said piston and so mounted such that said first bias spring is in bearing relationship with said housing and said base portion.

19. The device recited in claim 18 further comprising a liquid supply reservoir carried by said housing where said housing further comprises a first chamber in fluid communication with said liquid reservoir and said check valve means.

20. The device recited in claim 1 further comprising a liquid supply reservoir carried by said housing where said housing further comprises a first chamber in fluid communication with said liquid reservoir and said check valve means.

21. In combination:
A) a liquid supply reservoir, and
B) a device for mixing liquid contained in the liquid supply reservoir with water flow in a sprinkler system pipeline comprising:
  a) a housing having a first chamber in fluid communication with said supply reservoir, said housing further having a fertilizer chamber and a mixing chamber where said inlet and outlet ports are in fluid communication with said mixing chamber;
  b) a flexible diaphragm having an upper surface and a lower surface extending laterally within said housing, said flexible diaphragm further having a peripheral edge, where said peripheral edge is fixed with respect to said housing and so mounted thereto to form a seal between said fertilizer chamber and said mixing chamber, and where said fertilizer chamber is bounded in part by said upper surface and said mixing chamber is bounded in part by said lower surface;
  c) a central portion integrally carried by said flexible diaphragm and axially displaceable upon sufficient deflection of said diaphragm;
  d) first bias means carried by said housing responsive to axial displacement of said central portion for applying a restoring force to said central portion upon said axial displacement;
  e) valve means responsive to fluid pressure in said mixing chamber associated with said central portion for permitting and interrupting liquid flow from said fertilizer chamber into said mixing chamber;
  f) second bias means associated with said valve means and said central portion responsive to fluid pressure in said mixing chamber for actuating said valve means to permit liquid flow from said fertilizer chamber into said mixing chamber and to interrupt the flow; and
  g) check valve means carried by said housing and communicating with said fertilizer chamber responsive to fluid pressure in said fertilizer chamber for precluding retrograde flow of said liquid from said fertilizer chamber.

22. The combination recited in claim 21 where said central portion comprises a central disk carried in fixed relationship with said flexible diaphragm and having a lateral dimension less than the lateral dimension of said of said flexible diaphragm.

23. The combination recited in claim 22 where said central portion further comprises an axially extending piston fixed to said central disk, said piston having a base portion where said base portion has a vent opening communicating with said fertilizer chamber.

24. The combination recited in claim 23 where said central portion further comprises a diaphragm retainer extending axially from said central portion in part within said mixing chamber where said diaphragm retainer has an axially extending retainer void therein communicating with said vent opening.

25. The combination recited in claim 24 where said first bias means comprises a first bias spring associated with said piston and so mounted such that said first bias spring is in bearing relationship with said housing and said base portion.

26. The combination recited in claim 21 where said valve means comprises an axially extending restrictor pin, a pin holder integrally carrying said restrictor pin, an adjuster holder carrying said pin holder where said pin holder is fixed to said adjuster holder, and a valve seat associated with said central portion for receiving said pin holder where said valve seat and said pin holder are so dimensioned and proportioned such that upon bearing engagement the flow of said liquid into said mixing chamber is interrupted and upon sufficient disengagement said liquid is permitted to flow into said mixing chamber.

27. The combination recited in claim 26 where said central portion comprises a central disk carried in fixed relationship with said flexible diaphragm and having a lateral dimension less than the lateral dimension of said of said flexible diaphragm.

28. The combination recited in claim 27 where said central portion further comprises an axially extending piston fixed to said central disk, said piston having a base portion where said base portion has a vent opening communicating with said fertilizer chamber.

29. The combination recited in claim 28 where said central portion further comprises a diaphragm retainer extending axially from said central portion in part within said mixing chamber where said diaphragm retainer has an axially extending retainer void therein communicating with said vent opening.

30. The combination recited in claim 29 where said first bias means comprises a first bias spring associated with said piston and so mounted such that said first bias spring is in bearing relationship with said housing and said base portion.

31. The combination recited in claim 21 where said second bias mean comprises a second bias spring carried by said housing, an adjuster holder having an upper surface extending at least in part laterally within said mixing chamber and a lower surface in bearing relationship with said second bias spring, and a pin holder attached to said upper surface and an axially extending restrictor pin fixed to said pin holder.

32. The combination recited in claim 31 where said valve means comprises said axially extending restrictor pin, said pin holder, said adjuster holder, and a valve seat associated with said central portion for receiving said pin holder where said valve seat and said pin holder are so dimensioned and proportioned such that upon sufficient bearing engagement said liquid flow into said mixing chamber is interrupted and upon sufficient disengagement said liquid is permitted to flow into said mixing chamber.

33. The combination recited in claim 32 where said valve means comprises a central disk carried in fixed relationship with said flexible diaphragm and having a lateral dimension less than the lateral dimension of said flexible diaphragm.

34. The combination recited in claim 33 where said central portion further comprises a diaphragm retainer extending axially from said portion in part within said mixing chamber where said diaphragm retainer has an axially extending retainer void therein communicating with said vent opening.

35. The combination recited in claim 34 where said first bias means comprises a first bias spring extending at least in part in said void within said piston and so mounted such that said first bias spring is in bearing relationship with said housing and said base portion.

36. The combination recited in claim 32 where said central portion further comprises an axially extending piston fixed to said central disk, said piston having a base portion where said base portion has a vent opening communicating with said fertilizer chamber.

* * * * *